United States Patent [19]

Sasamoto et al.

[11] Patent Number: 5,659,438
[45] Date of Patent: Aug. 19, 1997

[54] HEAD POSITIONING CONTROL SYSTEM USING STORED VOICE COIL MOTOR CORRECTION DATA

[75] Inventors: Taturo Sasamoto; Kazunori Mori, both of Kawasaki, Japan

[73] Assignee: Fujitsu Limited, Kawasaki, Japan

[21] Appl. No.: 372,881

[22] Filed: Jan. 13, 1995

Related U.S. Application Data

[63] Continuation of Ser. No. 23,893, Feb. 26, 1993, abandoned.

[30] Foreign Application Priority Data

Mar. 19, 1992 [JP] Japan ................................. 4-063017

[51] Int. Cl.$^6$ ............................................. G11B 5/596
[52] U.S. Cl. .................................... 360/78.09; 360/78.04
[58] Field of Search ........................... 360/78.04, 78.09, 360/78.07, 78.06

[56] References Cited

U.S. PATENT DOCUMENTS

| | | | |
|---|---|---|---|
| 4,679,103 | 7/1987 | Workman | 360/78.07 |
| 4,835,633 | 5/1989 | Edel et al. | 360/78.04 X |
| 4,907,109 | 3/1990 | Seino | 360/78.04 |
| 4,954,907 | 9/1990 | Takita | 360/78.07 |
| 5,231,550 | 7/1993 | Hashimoto | 360/78.09 X |
| 5,287,234 | 2/1994 | Suzuki | 360/78.04 |
| 5,305,160 | 4/1994 | Funches et al. | 360/78.07 |

FOREIGN PATENT DOCUMENTS

| | | |
|---|---|---|
| 0493035 | 7/1992 | European Pat. Off. . |
| 63-100677 | 5/1988 | Japan . |
| 2154377 | 6/1990 | Japan . |
| 4221471 | 8/1992 | Japan . |

*Primary Examiner*—Aristotelis Psitos
*Assistant Examiner*—James L. Habermehl
*Attorney, Agent, or Firm*—Greer, Burns & Crain, Ltd.

[57] ABSTRACT

A head positioning control system including a head for reading and writing data from and to a magnetic recording medium such as a magnetic disk of a magnetic disk drive, and an actuator for moving the head, effects head positioning control by driving the actuator on the basis of a position signal generated from the signal read out from the head. The control system compares a first velocity signal obtained by differentiating the position signal with a second velocity signal obtained by integrating a driving current fort driving the actuator, and so operates so as to correct the driving current of the actuator in a direction in which the difference of these velocity signals is offset. Preferably, the control system stores in advance the ratio of the velocity signals as correction data. Further, the control system reads out the correction data during a seek operation of the head, increases the driving current of the actuator on the basis of this correction data, and corrects the drop in torque of the actuator in the vicinity of the innermost and outermost cylinders of the magnetic disk.

8 Claims, 11 Drawing Sheets

$F = Bli$

POSITION OF CYLINDER

HEAD POSITIONING CONTROL SYSTEM USING STORED VOICE COIL MOTOR CORRECTION DATA

RELATED APPLICATION

This is a continuation of application Ser. No. 08/023,893 filed on Feb. 26, 1993 now abandoned.

BACKGROUND OF THE INVENTION

1. Field of the Invention

This invention relates to a head positioning control system for positioning a head to stably carry out a write/read operation of data on a recording medium such as a disk in various magnetic disk drives and optical disk drives.

More particularly, the present invention relates to a head positioning control system equipped with a function of correcting the drop in a torque generated in an actuator for moving the head to a predetermined position of a recording medium in order to quickly and correctly position the head.

2. Description of the Related Art

Recently, the demand for a greater data capacity and a higher operational speed for computer systems, has been increasing, and this also holds true of auxiliary storage devices such as magnetic disk drives and optical disk drives for exchanging data with host computers. To satisfy this demand, the density of a recording medium surface of a magnetic disk drive or an optical disk drive must be increased (a track pitch of not greater than 10 μm, for example).

In these magnetic and optical disk drives, a data read/write operation is carried out by controlling an actuator so as to move a head from a current track (cylinder) position on a disk to a target track (cylinder) position, and thus positioning the head to the designated target track position. In such a positioning control system, high speed positioning is a requisite without causing any vibration of the actuator, etc., even in a settling time after the movement of the head.

To enable the head positioning control system described above more easily to be understood, a head positioning system according to the prior art will be explained with reference to the accompanying drawings.

FIG. 1 is a block diagram showing a head positioning control system according to the prior art, FIGS. 2(A) and 2(B) are explanatory views useful for explaining the operation of the principal portions of FIG. 1, and FIGS. 3(A) to 3(C) are explanatory views of a VCM shown in FIG. 1. However, a positioning control system of a magnetic head in a magnetic disk drive will be explained hereby as a typical example.

Reference numeral 1 denotes a magnetic disk, 2 is a spindle motor, 3 is a magnetic head, 4 is an actuator including a voice coil motor (VCM), 5 is a power amplifier, 6 is a switch consisting of an analog switch, etc., 7 is an AGC amplifier, 8 is a regulating resistor, 9 is a position signal demodulator, 10 is a position signal selector, 11 is a velocity detector, 12 is an analog-to-digital converter (hereinafter referred to as the "A/D converter"), 13 is a controller (such as a microprocessor: MPU), 14 is a digital-to-analog converter (hereinafter referred to as the "D/A converter"), and 15 is a comparator. In FIGS. 3(A) and 3(B), reference numeral 21 denotes a rotary spindle of the actuator 4, 22 is a coil, and 23 is a magnet.

In conventional disk drives, head positioning servo control has been carried out conventionally by a head positioning control system such as the control system shown in FIG. 1, that is, a head positioning servo control circuit.

In FIG. 1, the magnetic disk 1 has the function of a recording medium which is rotated by the spindle motor 2, and the magnetic head 3 writes and reads data to and from the magnetic disk 1. Here, the magnetic heads 3 are disposed on the upper and lower surface of each of a plurality of magnetic disks 1. When servo control is effected by a servo surface servo system utilizing a servo surface, one of the surfaces of the magnetic disk 1 is used as the servo surface recording thereon the servo data.

A rotary actuator or a linear movement type actuator has been used mainly for the actuator 4, but the rotary actuator will be dealt with hereby as a typical example. This rotary actuator 4 includes a voice coil motor 40 (hereinafter referred to as "VCM") as its main constituent, and this VCM 40 moves the magnetic head 3 in a radial direction of the magnetic disk 1.

The AGC amplifier 7 effects automatic gain control for the signal read by the magnetic head 3 so as to have a constant level. The position signal demodulator 9 generates two position signals POSN and POSQ having mutual a phase difference of 90° from the servo signal read by the magnetic head 3.

The regulating resistor 8 is disposed so as to regulate a feedback quantity from the position signal demodulator 9 to the AGC amplifier 7.

The A/D convertor 12 converts the two position signals POSN and POSQ to digital signals.

The position signal selector 10 selects a linear portion of the position signal POSN if the number of a track is even-numbered, and a linear portion of the position signal POSQ if the number of the track is odd-numbered, and generates a fine control signal FINS.

In the case of one magnetic disk drive having a plurality of magnetic disks 1, the positions at which the data read/write operation can be made simultaneously from these magnetic heads 3 assume a cylindrical shape. Therefore, the term "cylinder" will be used sometimes in place of the term "track".

The velocity detector 11 differentiates the position signals POSN and POSQ and detects an actual velocity as the current velocity of the magnetic head 3. The D/A convertor 14 converts a designated velocity (digital signal) output from the controller 13 to an analog signal.

The comparator 15 subtracts the actual velocity detected by the velocity detector 11 from the analog designated velocity output from the D/A convertor 14, and generates a velocity error.

The switch 6 has the function of selecting either one of coarse control for positioning control of the magnetic head 3 and high precision fine control by an analog switch, or the like, and outputs the velocity error described above in the coarse control and the fine control signal FINS in the fine control.

The power amplifier 5 drives the VCM 4 on the basis of the output of the switch 6.

The controller (e.g., MPU) 13 detects the position from the output of the A/D converter 12, generates a designated velocity in accordance with a velocity curve, outputs it to the D/A converter 14, detects the arrival of the position near the target position, and changes over the switch 6 from the coarse control to the fine control.

In the construction described above, the AGC amplifier 7, the position signal demodulator 9, the regulating resistor 8, the position signal selector 10, the velocity detector 11, the A/D converter 12, the controller 13, the D/A converter 14, the comparator 15, the switch 6 and the power amplifier 5 constitute the head positioning servo control circuit.

Next, the operation of this head positioning servo control circuit will be explained.

Receiving a seek instruction for a data read/write operation from a host apparatus, the controller 13 first changes over the switch 6 to the coarse control side.

Next, the controller 13 generates a velocity curve in accordance with the number of tracks from the current track to the target track, outputs the designated velocity to the D/A converter 14, applies the velocity error from the comparator 15 to the power amplifier 5 through the switch 6, and drives the VCM 40.

The AGC amplifier 7 controls a signal level difference between the inner periphery and the outer periphery of the magnetic disk 1 to be a constant value, by the use of the servo data read by the magnetic head 3 from the servo surface of the magnetic disk 1, and sends its output to the position signal demodulator 9.

The position signal demodulator 9 generates the two-phase position signals POSN and POSQ having a mutual phase difference of 90°, as shown in FIG. 2(A).

The position signals POSN and POSQ are converted to digital signals by the A/D converters 12 and are then input to the controller 13. The controller 13 detects the position of the magnetic head 3 and generates the designated velocity in accordance with this detected position.

The position signals POSN and POSQ are also input to the velocity detector 11, where the actual velocity is detected. This actual velocity is input to the comparator 15 and the comparator 15 outputs a velocity error corresponding to the difference between the designated velocity and the actual velocity.

Judging that the position reaches the vicinity of the target position by the position detection operation described above, the controller 13 changes over the switch 6 to the fine control side, and applies the fine control signal FINS output from the position signal selector 10 to the power amplifier 5.

As a result, the fine control is made for the VCM 40 and the magnetic head 3 is positioned to, and held at, the target position.

In the head positioning control described above, the position signals POSN and POSQ represent each position of the magnetic head 3. Generally, a position sensitivity varies from magnetic head 3 to head due to variance of the magnetic characteristics of each magnetic head 3. For this reason, the amplitudes of the position signals must be controlled to constant amplitudes for each apparatus.

To adjust such a position sensitivity, it has been a customary practice to regulate the regulating resistor 8 so that the amplitude of each position signal becomes constant in the state where the cylinder 0 is on-track, or to Judge the level of the position signal (e.g., 4.0 V) by repeating the seek operation to regulate the regulating resistor 8, as shown in FIG. 2(B).

Here, the VCM 40 constituting the actuator (rotary actuator) 4 of the magnetic head 3 has a structure such as shown in FIGS. 3(A) to 3(C), for example.

FIG. 3(A) shows an overall structure (plan view) of the VCM 40, FIG. 3(B) is a rear view as viewed from the back of the magnet 23, and FIG. 3(C) is a diagram showing the characteristics of the VCM 40.

As shown in FIGS. 3(A) and 3(B), the actuator 4 is allowed to rotate in directions indicated by arrows in the drawing with the rotary spindle 21 being the center.

The magnetic head 3 is disposed at the distal end of the actuator 4, and a coil 22 as the principal constituent of the VCM 40 is disposed on the opposite side of the magnetic head 3 with respect to the rotary spindle 21.

An arcuate magnet (permanent magnet) 23 is disposed round the coil 22, and the coil is disposed inside the magnetic field generated by this magnet 23.

In other words, the magnet 23 and the coil 22 together constitute the VCM. When a current is caused to flow through the coil, the coil is rotated in the directions indicated by arrows in the drawing (in both directions) between both ends a and b of the magnet 23, for example.

The voice coil is so constructed that the magnetic head 3 comes to the position of the cylinder 0 ($C_0$) of the magnetic disk 1 when the coil 22 rotates to the end a, and to the position of the maximum cylinder n ($C_n$) when the coil 22 rotates to the end b, for example.

In this case, the magnetic flux leaks outward at the end portion of the space defined between a pair of upper and lower magnets, and a homogeneous flux distribution is not insured. Accordingly, the flux density B tends to become lower in the vicinity of the cylinder 0 ($C_0$) position and the maximum cylinder n ($C_n$) position corresponding to the end portions a and b of the magnet 23, respectively, as shown in FIG. 3(C), than at the portion in the vicinity of the cylinder center.

As a result, even when a current i of the same value is caused to flow through the coil 22, a torque $F=B \cdot l \cdot i$ generated by the VCM drops to the extent corresponding to the drop of the flux density B in the vicinity of both end portions ($C_0$, $C_n$) of the cylinder. Here, l is an effective length of the coil 22.

The head positioning control system according to the prior art described above involves the following problems.

Namely, when the head positioning control is carried out, the prior art is based on the premise that the flux density B of the magnet of the VCM is constant within a movable range of the coil.

Practically, however, the flux density B becomes lower in the velocity of the innermost and outermost cylinder regions ($C_0$, $C_n$) than in the vicinity of the center cylinder region, as is obvious from the characteristics of the VCM.

As a result, the torque generated by the actuator 4 drops more in the vicinity of the innermost and outermost cylinder regions than in the vicinity of the center cylinder of the head even when a current of the same value is caused to flow through the coil. If the total number of cylinders is 2,000, for example, the portions at which the torque becomes lower than a rated value are from 100 to 200 cylinders at each end portion.

Since the torque drops in this way, the actuator 4 cannot move the magnetic head 3 by the force originally expected. As a result, a longer time is necessary for the magnetic head 3 to reach the target cylinder and even after it reaches the target cylinder, the actuator 4 tends to oscillate or a longer settling time is necessary because over-shoot of acceleration of the actuator 4 is great. Furthermore, even after the position of the magnetic head 3 becomes fixed and the head starts a track following operation which permits the read/write operation, stability of the servo control system to an external impact gets deteriorated because the gain of the servo control system is less than expected.

These problems become all the more critical as the density of the surface of the recording medium such as the track surface of the magnetic disk becomes higher and higher so as to satisfy the demand for a greater recording capacity and a higher operational speed. With this increase in the density of the recording medium surface, torque fluctuation resulting from a temperature change or a change with time becomes more and more severe.

These problems can be solved, in principle, by increasing the size of the magnet and using only the central portion of such a magnet. According to this structure, however, the size of the magnetic becomes unnecessarily large and hence, the size of the magnetic drive itself also becomes large. This is quite contradictory to the recent demand for compact apparatus.

Further, as another countermeasure for addressing these problems, a method, in which absolute gain versus frequency characteristics with respect to an open loop gain in a servo control system for head positioning as illustrated in FIG. 4 are measured over the cylinders by utilizing a spectrum analyzer, has been disclosed. By means of Such a method, since a fluctuation of the gain versus frequency characteristics ranging from the central cylinder to the innermost and outermost cylinder regions is evaluated, the decrease of a torque of an actuator in the vicinity of the end positions appears to be easily corrected.

To be more specific, if the head is placed in the vicinity center of the cylinder where the flux density B is substantially constant, the gain versus frequency characteristic curve is represented as the solid line I in FIG. 4, and a zero crossing frequency $f_0$ (Hz) where the corresponding gain value $G_{0\ 1}$ becomes 0 dB is obtained from the solid line I. On the contrary, if the head is placed in the vicinity of either the innermost or outermost cylinder regions where the flux density B is decreased, the gain versus frequency characteristic curve is shifted toward the left direction, as shown in the dotted line II in FIG. 4. In this case, a gain value which corresponds to the above-mentioned frequency $f_0$ is reduced to $G_{0\ 2}$. By utilizing the correction factor K ($=G_{0\ 1}/G_{0\ 2}$) calculated based on these gain values $G_{0\ 1}$, $G_{0\ 2}$, the decrease of torque in the vicinity of the innermost and outermost cylinder regions can be finally corrected.

However, in this case, it is necessary for the specified correction factors K to be calculated by measuring the respective gain versus frequency characteristic curves in various cylinder positions by means of a large-scale measuring apparatus such as a spectrum analyzer. Accordingly, the method related to FIG. 4 has a disadvantage that it takes a lot of time and labor to measure the gain versus frequency characteristics.

Furthermore, as still another countermeasure for addressing these problems, a method in which a seek time is measured by performing a seek operation in advance at each current position and each target position of the cylinder as illustrated in FIG. 5, has also been disclosed. In this method, by utilizing the fact that the seek time is increased, as the torque of an actuator is decreased due to the decrease of the flux density B in the vicinity of the end positions of the cylinder, the decrease of the torque appears to be easily corrected.

To be more specific, if the head is moved from the current position to the target position in the vicinity of the central position of the cylinder where the flux density B is substantially constant, the relatively short seek time T2 is Obtained, as shown in the curve α. On the contrary, if the head is moved in the vicinity of either end of the cylinder where the flux density B is decreased and where the torque of an actuator is not sufficiently effected in an acceleration area, the longer seek time T4 (T4>T2) is obtained, as shown in the curve β, because the overshoot of the head occurs and continues approximately until the time T3 even after the head reaches the target position at the time T1. By utilizing the correction factor K (=T4/T2) calculated based on these kinds of seek times T2, T4, the decrease of torque in the vicinity of the end positions of the cylinder can be also corrected.

In such a method, a large-scale measuring apparatus such as a spectrum analyzer is unnecessary. However, the seek time must be measured in advance by every combination of each current position and each target position of the cylinder. Consequently, as the number of cylinders is increased due to the increase of track density of the disk, the time and labor for previously measuring the seek time is likely to be increased, and therefore the method related to FIG. 5 is not practicable.

SUMMARY OF THE INVENTION

In view of the problems with the prior art described above, it is a main object of the present invention to provide a head positioning control system capable of stably effecting a data read/write operation throughout all portions of the surface of a recording medium such as a magnetic disk.

In is another object of the present invention to provide a head positioning control system which permits a stable operation of an actuator for moving a magnetic head to a predetermined position on a recording medium in a magnetic disk drive, or the like.

In is still another object of the present invention to provide a head positioning control system having the functions of correcting the drop of a torque generated by an actuator in a magnetic disk drive, etc., and of quickly and correctly positioning a head.

It is still another object of the present invention to provide a head positioning control system having the function of correcting the drop in torque in the vicinity of the innermost and outermost track/cylinder regions of the surface of a recording medium in a magnetic disk drive, etc.

To accomplish the objects described above, a head positioning control system according to the present invention includes a head for reading and writing data from and to a recording medium; an actuator for moving the head to a predetermined position on the surface of the recording medium; means for generating position signals representing a current position of the head relative to the surface of the recording medium from the signal read from the head; and means for effecting a head positioning control by driving the actuator on the basis of the position signals. Further, the head positioning control system compares a first velocity signal obtained by differentiating the position signal with a second velocity signal obtained by integrating a driving current for driving the actuator, and corrects the driving current of the actuator in such a manner as to offset the difference between these two velocity signals.

Preferably, a ratio of the two velocity signals is determined, and this velocity signal ratio is stored in advance as data for correction.

Further, preferably, the velocity signal ratio thus stored in advance is read out, and the drop of the torque of the actuator is corrected on the basis of the velocity signal ratio thus read out.

Further, preferably, the head positioning control system according to the present invention is applied to a magnetic disk drive using a magnetic disk as a recording medium.

Further, preferably, a VCM is used for the actuator in the magnetic disk drive, and the drop of the torque of the actuator is corrected with the drop of a flux density of this voice coil motor. In this case, the drop of the torque particularly in the vicinity of the innermost and outermost cylinder regions of the magnetic disk is corrected.

The above and other objects and novel features of the present invention will become more apparent from the following detailed description thereof in conjunction with the accompanying drawings.

DESCRIPTION OF THE PREFERRED EMBODIMENTS

Figure 6:
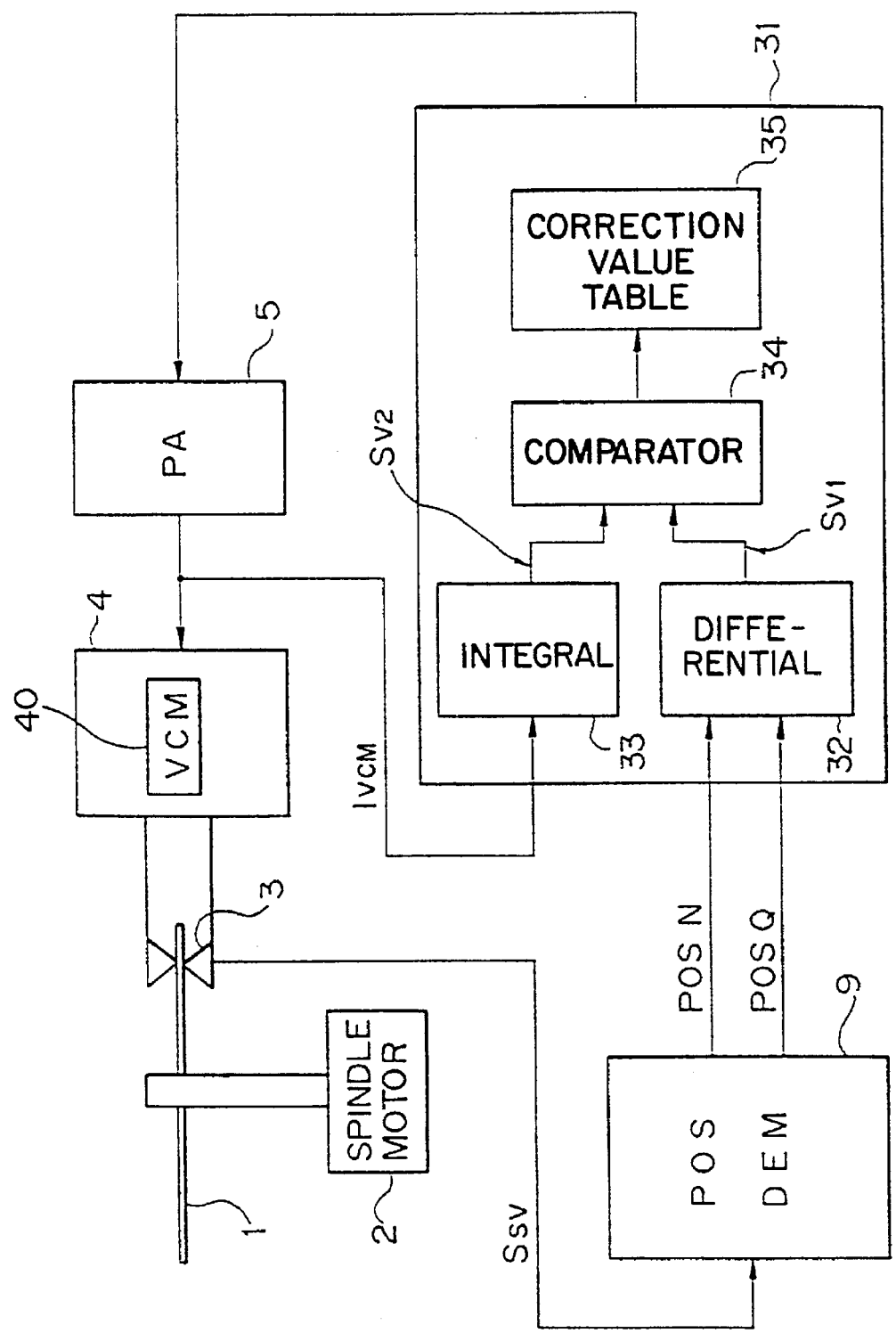
FIG. 6 is a view showing an embodiment based on the basic principle of the present invention.

FIG. 6 shows an embodiment based on the principle of the present invention. In the drawing, like reference numerals are used to identify like constituents to those in FIGS. 1 to 5. Reference numeral 31 denotes a head positioning servo control processor, 32 is a differential arithmetic unit, 33 is an integral arithmetic unit, 34 is a comparator, and 35 is a correction value table.

The embodiment shown in FIG. 6 employs the following structure.

In a disk drive including a head 3 for writing and reading data onto and from a disk 1, an actuator 4 for moving the head 3 in a radial direction of the disk 1, means 9 for generating two position signals POSN and POSQ from servo signals read out from the head 3, and means 31, 5 for driving the actuator 4 on the basis of the two position signals and effecting positioning control of the head 3, this embodiment determines a velocity signal by differentiating the position signals POSN and POSQ (hereinafter referred to as "first velocity signal $S_{v1}$") and another velocity signal obtained by integrating a current value flowing through the actuator 4 (hereinafter referred to as "second velocity signal $S_{v2}$"), and corrects the drop in the torque of the actuator corresponding to each position of a cylinder by comparing these two velocity signals.

In the construction described above, a ratio of the first velocity signal $S_{v1}$ to the second velocity signal $S_{v2}$ is determined, and this ratio of the velocity signals is stored as data for correction, by comparing these two velocity signals.

The ratio of the velocity signals, which is stored in advance, is read out during a seek operation, and the drop in the torque of the actuator 4 is corrected on the basis of the velocity signals thus read out.

In the construction described above, a VCM is used as the actuator 4 so as to correct the drop in the torque resulting from the drop in the flux density of this VCM.

Furthermore, in the construction described above, the correction is the one that corresponds to the drop in the torque near the innermost and outermost cylinder region.

The effect of the present invention based on the construction described above will be explained next with reference to FIG. 6.

A position signal demodulator 9 generates position signals POSN (position N) and POSQ (position Q) having two phases from the servo signal read by the head 3.

These position signals are differentiated by the differential arithmetic unit 32 to obtain the first velocity signal $S_{v1}$.

The integration unit 33 also inputs a current to be applied to the VCM 40 constituting the actuator (VCM current), and integrates the VCM current values to obtain the second velocity signal $S_{v2}$.

The comparator 34 determines the ratio of the two velocity signals, and sets the ratio value as data for correction (correction value) to the correction value table 35.

This process for setting the data for correction (correction value) is executed from the inside cylinder to the outside cylinder in an arbitrary interval.

When the normal seek operation is carried out by driving the VCM 40, this operation is carried out under servo control by the head positioning servo control processor 31.

At this time, the processor 31 reads out the correction value from the correction value table 35, corrects the gain of the servo control, and increases the current value to be supplied from a power amplifier 5 to the VCM 40.

According to this arrangement, the VCM 40 exhibits characteristics such that it detects the drop in the torque, which occurs near the innermost and outermost cylinders, and can accurately correct this torque drop.

As a result, high precision positioning control of the head 3 becomes possible.

Since the process for determining the ratio of the velocity signals can be carried out in parallel with the seeking operation, high speed processing becomes possible.

Preferred embodiments of the invention will be explained in further detail with reference to the drawings.

Figure 7:
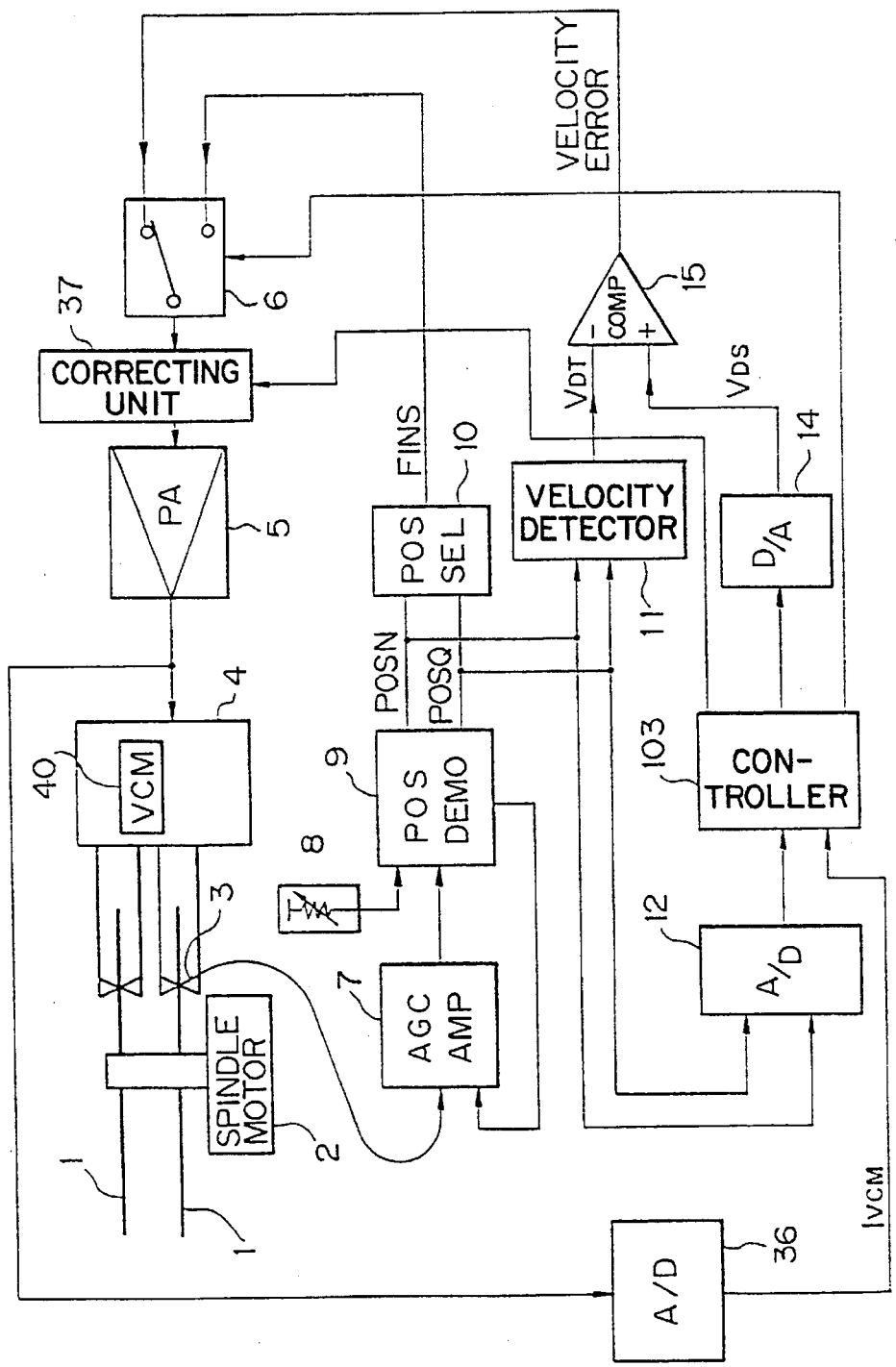
FIG. 7 is a block diagram showing a head positioning control system according to an embodiment of the present invention.
Figure 8:
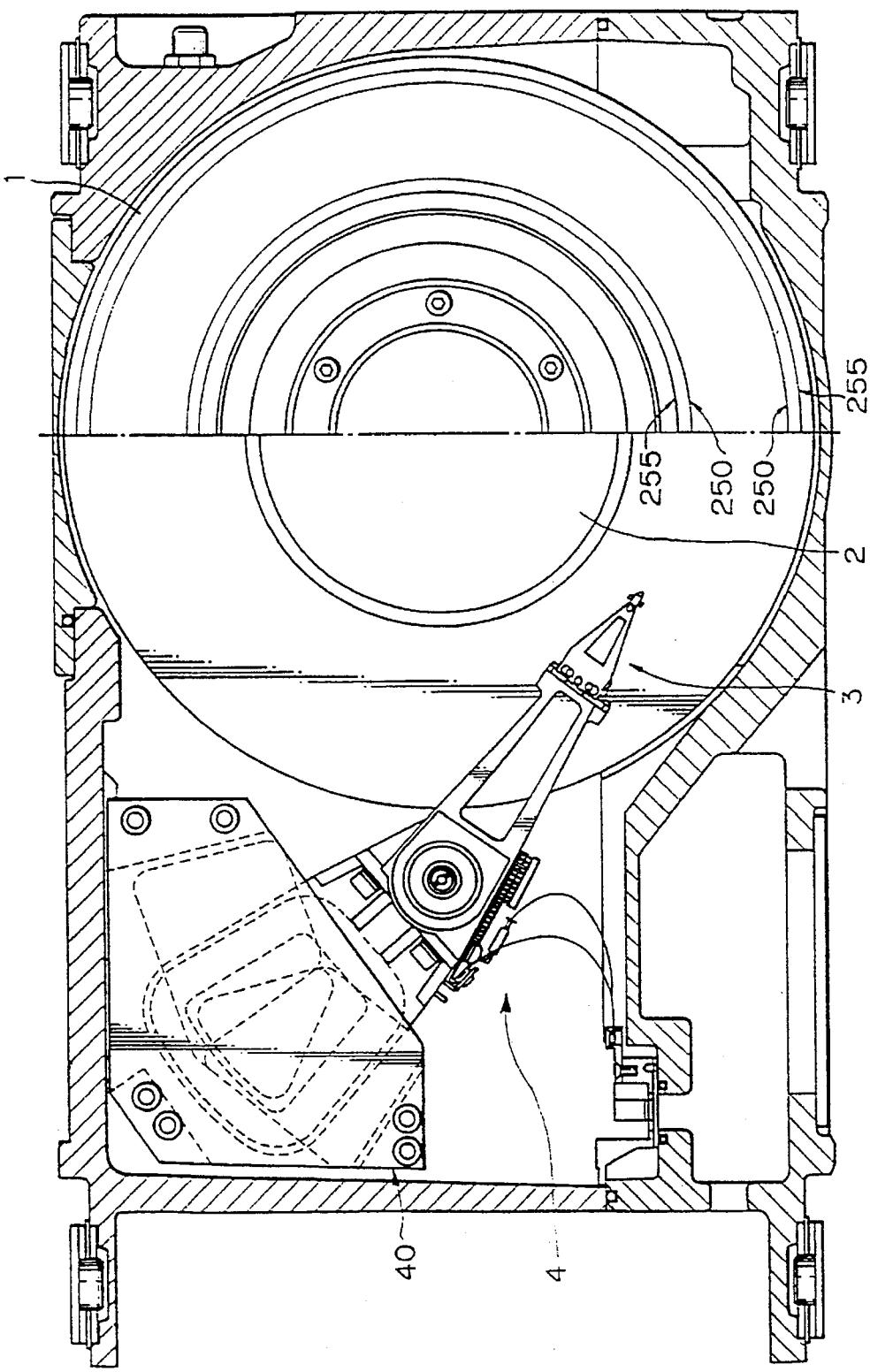
FIG. 8 is a partially cut-away perspective view showing a mechanism of a magnetic disk drive.
Figure 9:
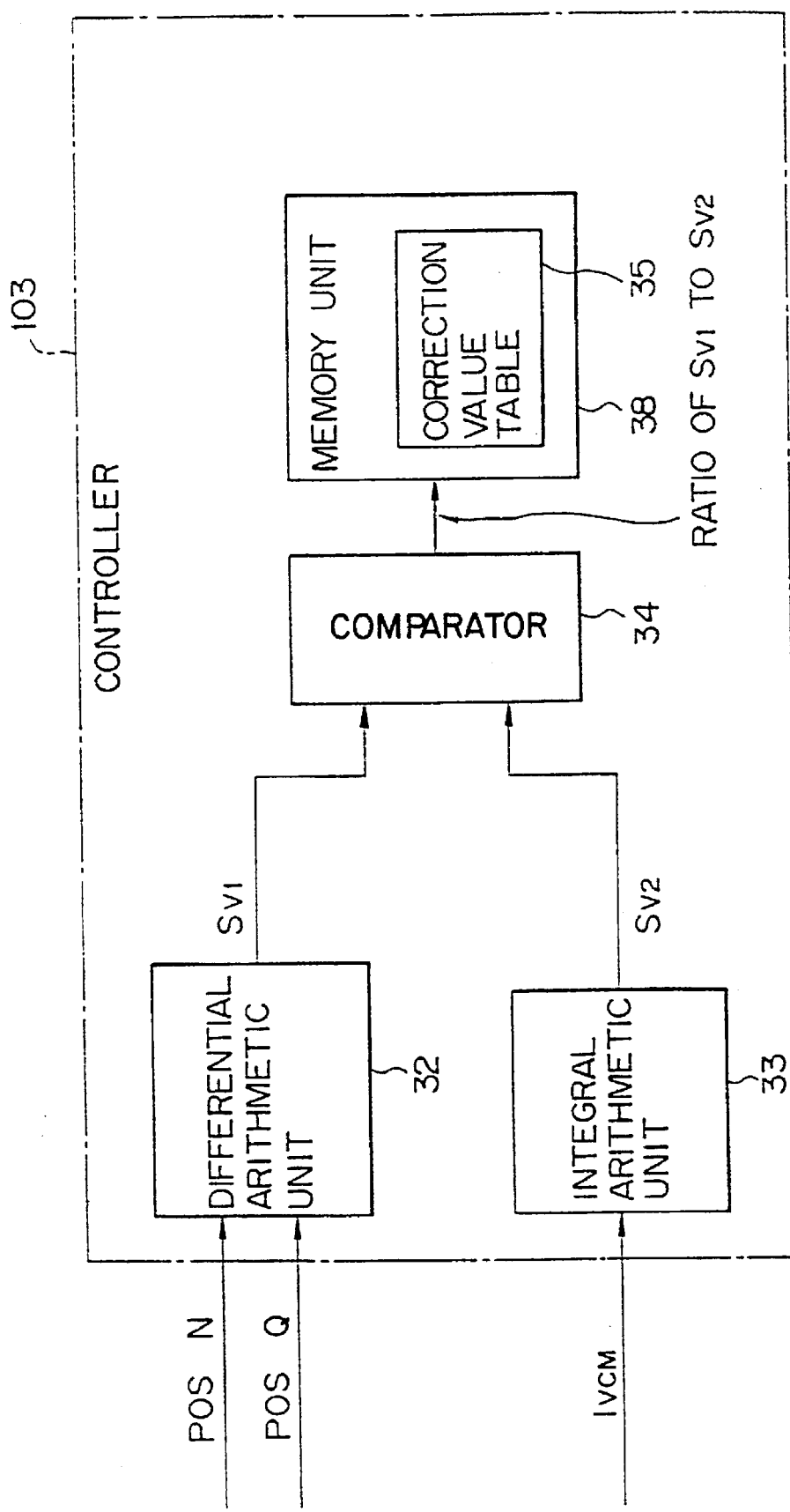
FIG. 9 is a block diagram of a controller shown in FIG. 7.
Figure 10:
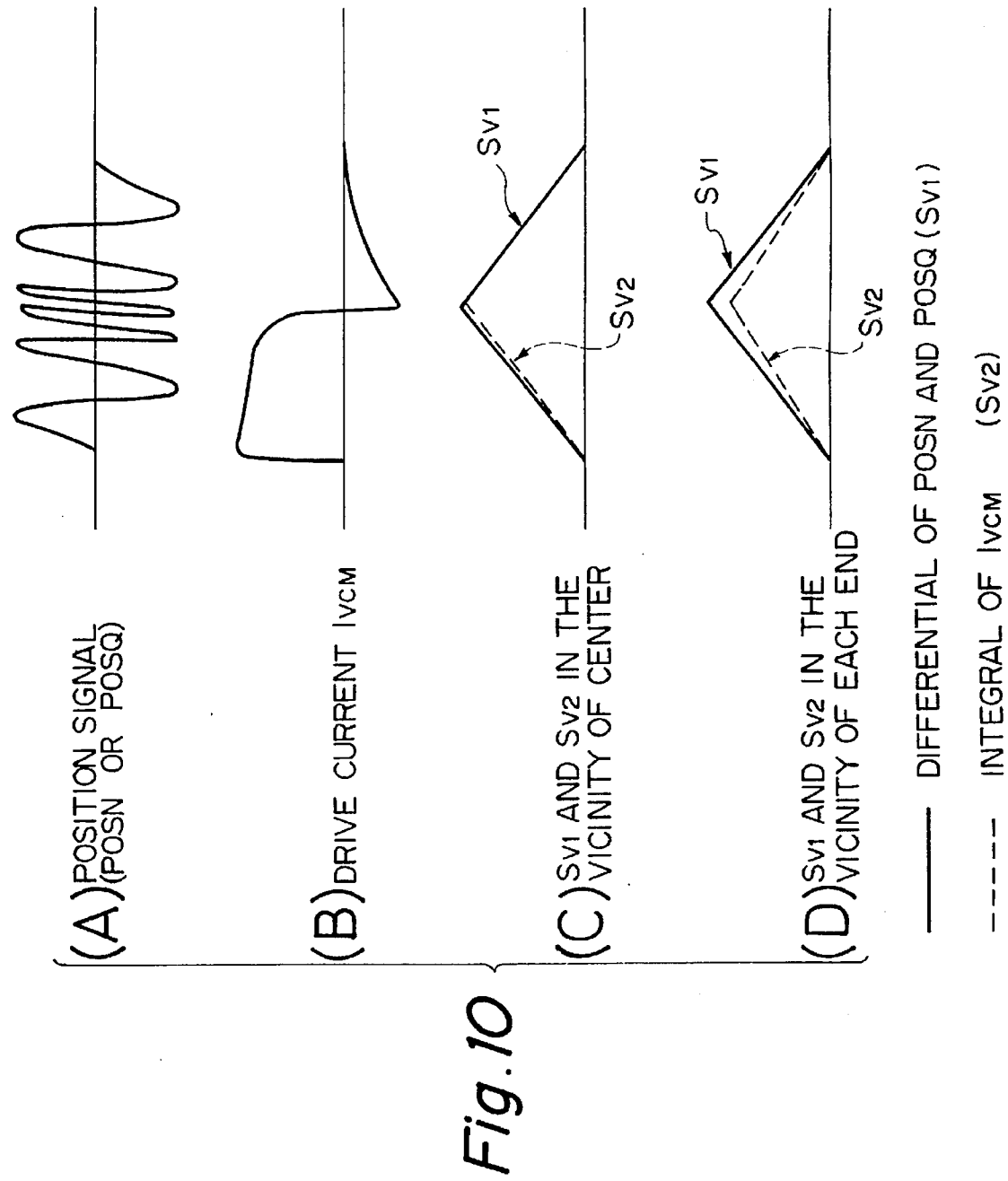
FIGS. 10(A) to 10(D) is a signal waveform diagram of each portion shown in FIG. 7.
Figure 11A:
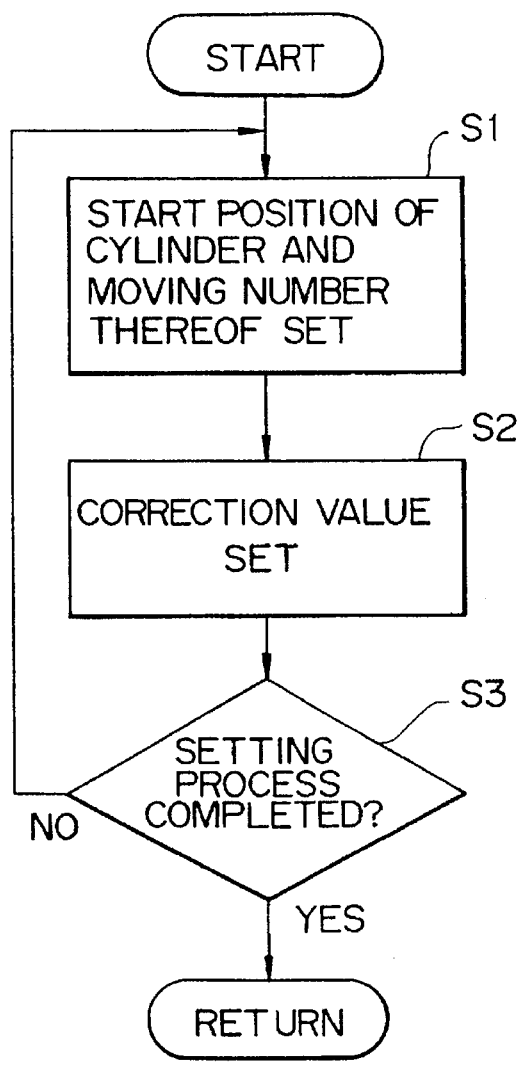
FIGS. 11(A) and 11(B) are flowcharts useful for explaining a correction value setting process in the embodiment shown in FIG. 2.
Figure 11B:
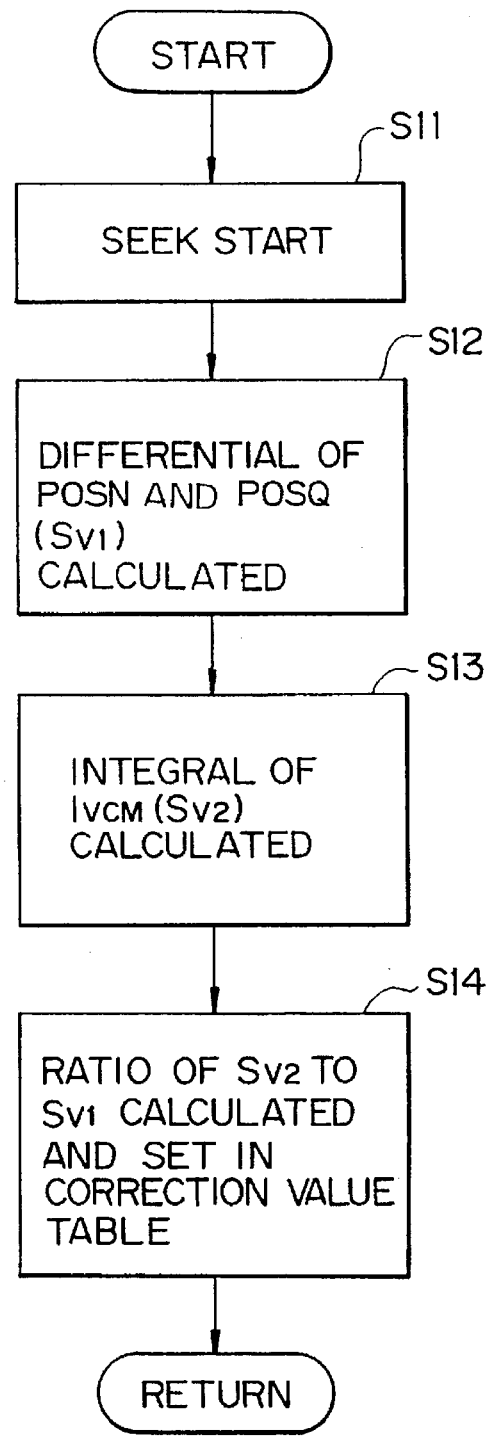

FIGS. 7 to 11(B) show the preferred embodiments, wherein FIG. 7 is a block diagram of the head positioning servo control circuit, FIG. 8 is a schematic view showing a mechanism of a magnetic disk drive to which the present invention is applied, FIG. 9 is a block diagram of the control unit shown in FIG. 7, FIG. 10 is a signal waveform diagram of each portion, and FIGS. 11(A) and 11(B) are flowcharts of a correction value setting process.

In these drawings, like reference numerals are used to identify like constituents to those in FIGS. 1 to 6. Reference numeral 37 denotes a correction unit, 38 denotes a memory unit, and 36 denotes an A/D converter.

Figure 1:
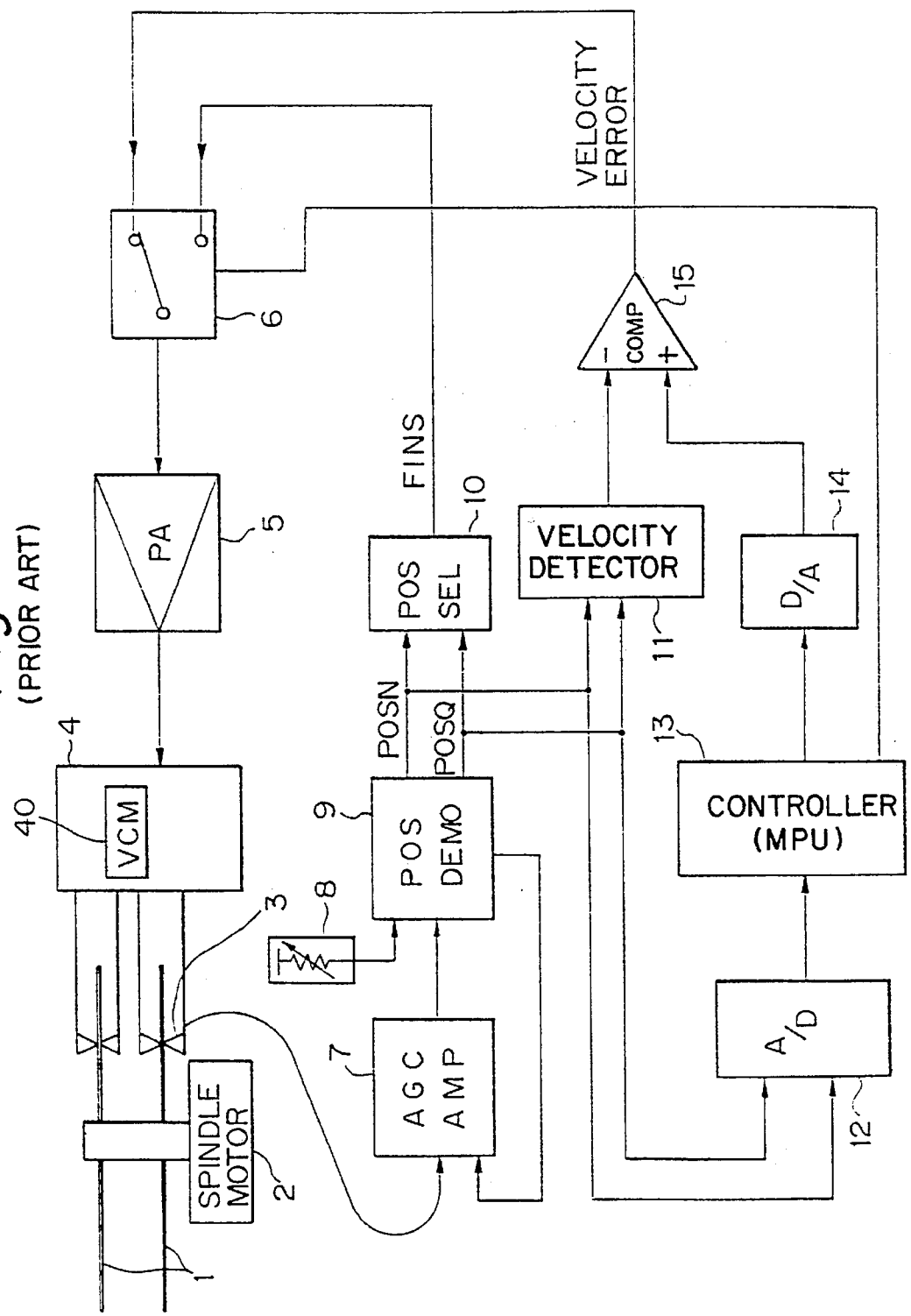
FIG. 1 is a block diagram of a head positioning control system according to the prior art.

In this embodiment, the correcting unit 37 and the A/D convertor 36 are added to the circuit of the prior art example shown in FIG. 1 and furthermore, the controller 103 is constructed as shown in FIG. 9.

In other words, as shown in FIG. 7, the power amplifier 5, the correcting unit 37, the switch 6, the AGC amplifier 7, the position signal demodulator 9, the velocity detector 10, the velocity detector 11, the A/D converters 12, 36, the D/A converter 14, the controller 103 and the comparator 15 are disposed in the head positioning control servo control circuit.

Further, in order to facilitate understanding of the embodiment of FIG. 7 according to the present invention, a partially sectional plan view showing a mechanism of a magnetic disk drive is illustrated in FIG. 8. In this case, as seen from FIG. 8, a plurality of disks 1 are rotated simultaneously. The tracks on a recording surface of each disk 1 are written with a predetermined data pattern. However, the tracks (cylinders) at both ends of the inner zone and the outer zone of each disk 1 are formed as guard bands 250 in which a particular pattern is written, instead of a data pattern, which particular pattern is used for stopping a seek operation of the heads 3. These heads 3 are provided on the upper and lower surfaces of each disk 1, respectively, and are driven by the actuator 4 including the VCM 40. Further, at the inner and the outer sides of the guard band 250, an erase zone 255 is formed for mechanically stopping the head 3.

Furthermore, as shown in FIG. 9, the controller 103 is provided with a differential arithmetic unit 32, an integral arithmetic unit 33, a comparator 34 and a memory unit 38, and a correction value table 35 is provided inside the memory unit 38.

Figure 3A:
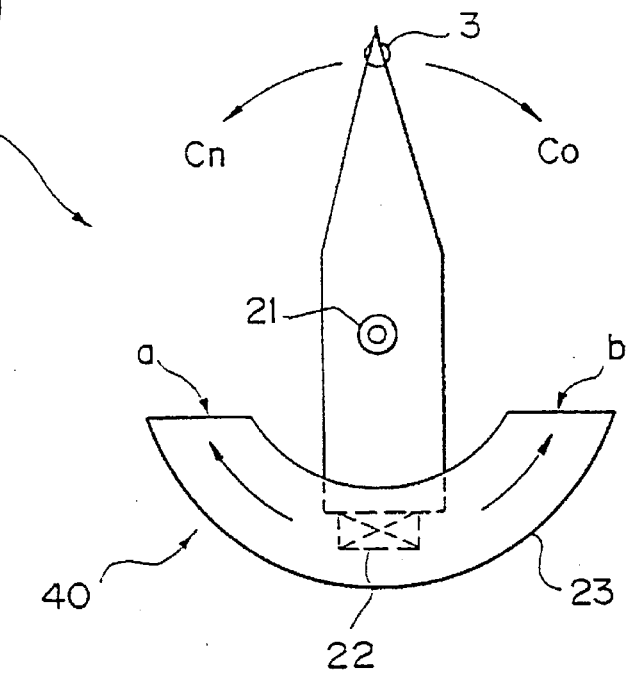
FIGS. 3(A) to 3(C) are explanatory views of a VCM shown in FIG. 1.
Figure 3B:
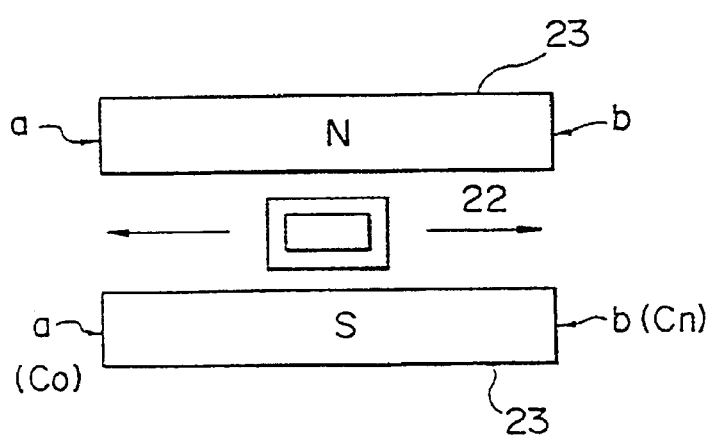

In FIGS. 7 and 8, the VCM 40 moves the magnetic head 3 in the radial direction of the magnetic disk 1, and the VCM having the structure shown in FIGS. 3(A) and 3(B) is used.

The AGC amplifier 7 conducts an automatic gain control (AGC) of the signals read by the magnetic head 3 and controls the signals to a constant level. The position demodulator 9 generates the two position signals (two-phase position signals) having a mutual phase difference of 90° from the servo signals read by the magnetic head 3, i.e., POSN and POSQ.

The A/D converter 12 converts the two position signals POSN and POSQ to digital signals, and the position signal selector 10 selects the linear portion of the position signal POSN when the track is even-numbered, and the linear portion of the position signal POSQ when the track is odd-numbered, and generates a fine control signal FINS.

The velocity detector 11 differentiates the two position signals POSN and POSQ and detects an actual velocity. The D/A converter 14 converts an instruction velocity output from the controller 13 to an analog signal.

The comparator 15 subtracts the actual velocity detected by the velocity detector 11 from the instruction velocity (analog value) output from the D/A convertor 14, and generates a velocity error.

The switch 6 outputs the velocity error described above in coarse control, and outputs the fine control signal FINS in fine control.

The power amplifier 5 drives the VCM 40 in accordance with the output of the switch 6. The A/D converter 36 converts the VCM current sent from the power amplifier 5 to the VCM 40 to the digital signal.

The correcting unit 37 corrects the instruction value output to the power amplifier 5 on the basis of the instruction sent from the controller 103.

The controller 103 detects the position from the output of the A/D converter 12, generates an instruction velocity in accordance with a velocity curve, outputs it to the D/A converter 14, detects the approach near to the target position, and switches the switch 6 from the coarse control to the fine control.

In addition to the functions described above, the controller 103 sets the torque correction Value of the VCM 40 and gives the correction instruction to the correcting unit 37.

The differential arithmetic unit 32 inside the controller 103 effects differential computation of the two-phase position signals (POSN, POSQ) input through the A/D convertor 12, and outputs a first velocity signal $S_{v1}$ obtained by this differential computation.

The integral arithmetic unit 33 effects integral computation of the current value of the VCM current input through the A/D convertor 36, and outputs a second velocity signal $S_{v2}$ obtained by this integral computation.

The comparator 34 inputs the first velocity signal $S_{v1}$ and the second velocity signal $S_{v2}$, compares them with each other, and outputs their ratio (the ratio of the first velocity signal $S_{v1}$ to the second velocity signal $S_{v2}$).

The memory unit 38 includes therein the correction value table 35, and sets the ratio of the velocity signals obtained by the comparator 34 in the correction value table 35.

In the construction described above, the controller 103, the velocity detector 11, the comparator 15, the position signal selector 10, the correcting unit 37 and the switch 6 may be constituted by a DSP (digital signal processor), for example, and the function of each of these units may be accomplished by respective firmware.

In such a case, the function of each portion inside the controller 103 is also accomplished by firmware.

Figure 3C:
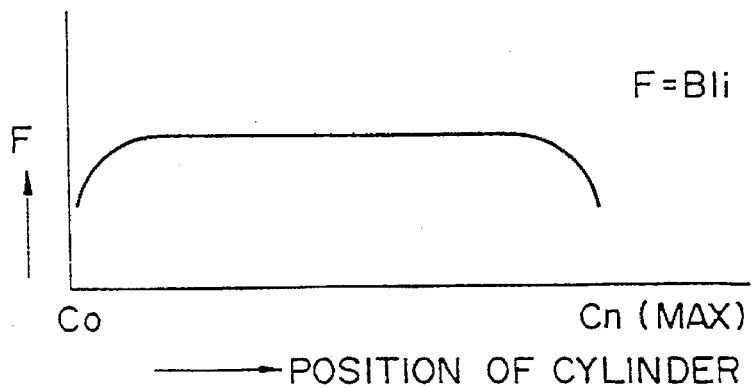
Figure 4:
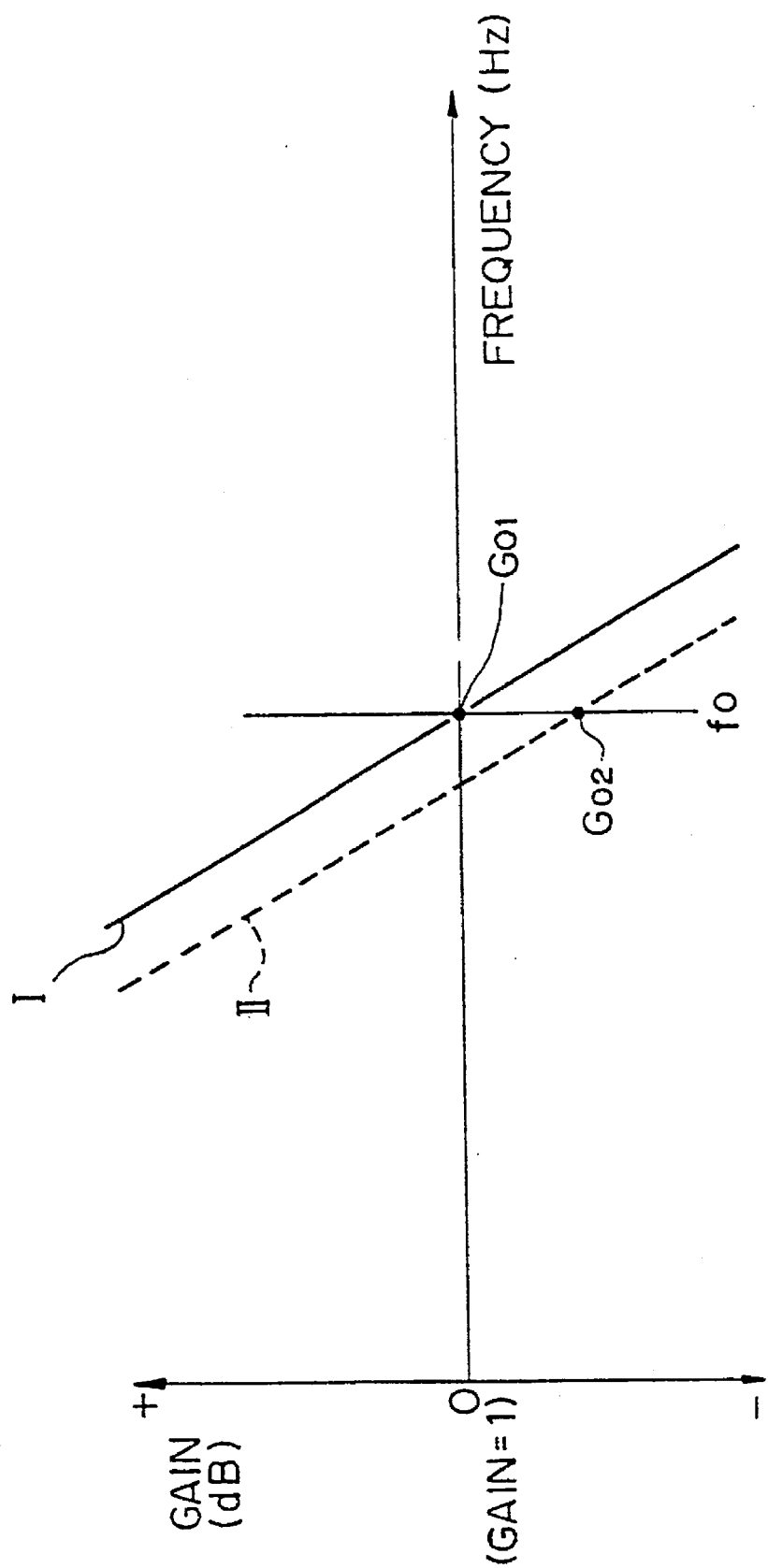
FIG. 4 is a graph for explaining one conventional method for correcting a decrease of torque of an actuator.
Figure 5:
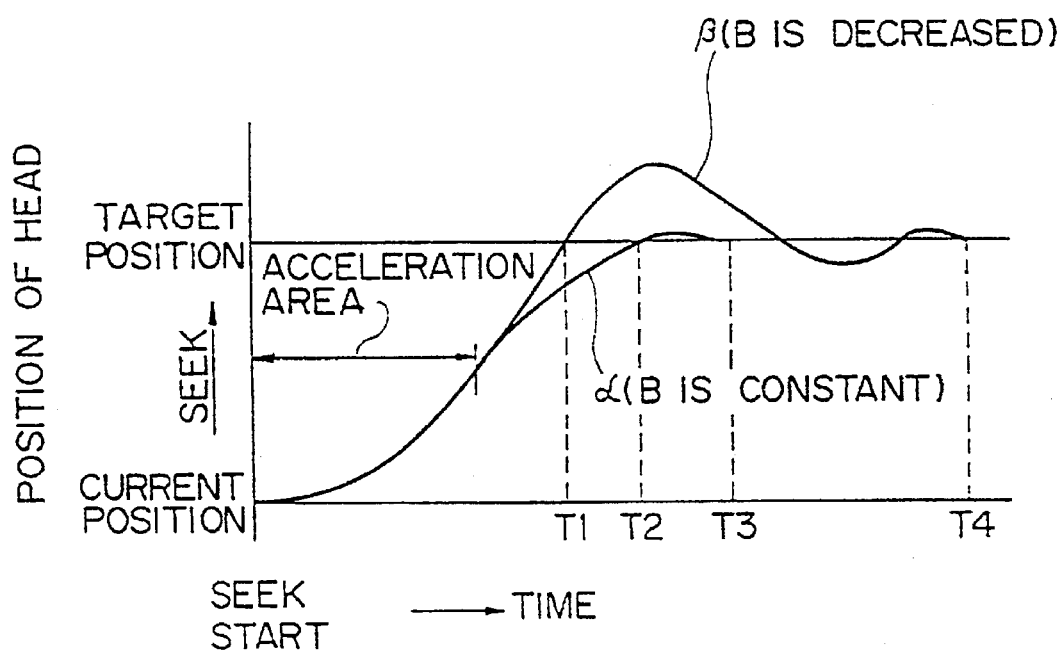
FIG. 5 is a graph for explaining another conventional method for correcting a decrease of torque of an actuator.

As already shown in FIG. 3(C), a drop in flux density B occurs near the position of the cylinder 0 and near the position of the maximum cylinder n, which is characteristic of the VCM 40, so that the torque of the VCM 40 drops.

In other words, the generation torque of the VCM 40 is determined by $F=B \cdot l \cdot i$ where B is the flux density, l is an effective length of the coil and i is the current flowing throught the coil, as described before. Accordingly, when the flux density B drops, the torque becomes small (with the proviso that l and i are kept constant).

To correct the drop in the torque of the VCM 40, therefore, a correction value is set in advance, and a target velocity signal is corrected. Hereinafter, the process of setting the correction value will be explained in detail.

In FIG. 10, symbol (A) represents the position signal(s) (POSN, POSQ) output from the position signal demodulator 9, symbol (B) represents the drive current ($I_{VCM}$) supplied to the VCM 40 also referred to as "VCM current", symbol (C) represents the velocity signals ($S_{v1}$, $S_{v2}$) near the center cylinder, and symbol (D) represents the velocity signals ($S_{v1}$, $S_{v2}$) near the innermost and outermost cylinders (cylinder 0 and maximum cylinder n).

Incidentally, solid lines in (C) and (D) of FIG. 10 represent the first velocity signal $S_{v1}$ (the output signal of the differential arithmetic unit 32), and dotted lines represent the second velocity signal $S_{v2}$ (the output signal of the integral arithmetic unit 33).

The position signals (POSN, POSQ) shown in (A) of FIG. 10 are converted to the digital signals by the A/D converters 12, are then differentiated by the differential arithmetic unit 32 inside the controller 13, and are converted to the first velocity signal $S_{v1}$ (represented by solid lines) in (C) and (D) of FIG. 10.

The VCM current shown in (B) of FIG. 10 is converted to a digital signal by the A/D converter 36, is then integrated by the integral arithmetic unit 33 inside the controller 13, and becomes the second velocity signal $S_{v2}$ (represented by dotted lines) shown in (C) and (D) of FIG. 10.

In the case described above, the position signals POSN and POSQ represent the position of the head at a certain time. Therefore, a velocity signal at that time can be obtained by differentiating the position signals.

Since the VCM current supplied to the VCM 40 is a signal corresponding to acceleration, another velocity signal can be obtained by integrating, time-wise, this VCM current.

The first velocity signal $S_{v1}$ is the velocity signal obtained from the actual position of the magnetic head 3, and the second velocity signal $S_{v2}$ is the velocity signal obtained from the current supplied to the VCM 40 (corresponding to the acceleration).

As described above, the VCM 40 has the characteristics such that the torque drops near the vicinity of the innermost and outermost cylinder regions. Therefore, although the value of the first velocity signal $S_{v1}$ is equal to that of the second velocity signal $S_{v2}$ near the center cylinder, the value of the velocity signal $S_{v2}$ becomes smaller than that of the velocity signal $S_{v1}$ in the vicinity of the innermost and outermost cylinder regions. In other words, since the value of the VCM current practically becomes small, a difference occurs in the values of the velocity signals.

Consequently, the ratio of the first velocity signal $S_{v1}$ to the second velocity signal $S_{v2}$, that is, $S_{v1}/S_{v2}$, becomes different between the portion in the vicinity of the center cylinder and the portions in the vicinity of the innermost and outermost.

To cope with this problem, the comparator 34 determines the ratio of the velocity signal $S_{v1}$ to the velocity signal $S_{v2}$ at an arbitrary cylinder position, and sets this value as the correction value in the correction value table 35 inside the memory unit 38. Torque correction is carried out using this correction value.

Next, a process for setting the correction value for the drop of the torque of the VCM 40 will be explained with reference to the flowcharts of FIGS. 11(A) and 11(B). FIG. 11(A) shows the main process, and FIG. 11(B) shows the correction value setting process. Each process number is given in the parentheses in FIGS. 11(A) and 11(B).

In FIG. 11(A), a start cylinder number and a moving cylinder number are set inside the controller 13 after the start of these processes (S1).

Next, the correction value is determined by a method that will be described below with reference to FIG. 11(B), and is set in the correction value table 35 inside the memory unit 38 (S2). This process is carried out from the inside zone near the innermost cylinder region to the outside zone near the outermost cylinder region at arbitrary intervals, and the processes described above (S1, S2) are repeatedly carried out until setting of the correction values is finished (S3).

The correction value setting process (process of S2) is carried out in the following way, as shown in FIG. 11(B).

First of all, a seek operation is started (S11), and the differential value (a first velocity signal $S_{v1}$) of the position signal is determined in the differential arithmetic unit 32 (S12).

The integration value of the VCM current (a second velocity signal $S_{v2}$) of the VCM current is obtained in the integral arithmetic unit 33 (S13) and subsequently, the comparator 34 determines the ratio of the two velocity signals (velocity signal $S_{v1}$ and $S_{v2}$) and sets the value in the correction value table 35 (S14).

The correction value setting process is thus completed.

The correction value setting process described above is carried out, for example, by storing in advance a program for setting the correction values inside the controller 103, and activating this program at the start of the operation of the apparatus such as turn-on of a power supply.

In this case, the correction value setting process shown in FIGS. 11(A) and 11(B) is completely carried out by the program described above.

The correction value is set from the inside zone to the outside zone, such as for each m cylinders (e.g., m=64; this m value is set in the program described above).

The correction values set in the correction value table 35 are a cylinder position and the ratio of the velocity signals (second velocity signal $S_{v2}$/first velocity signal $S_{v1}$) corresponding to that cylinder position.

For example, the velocity signal ratio value may be expressed in terms of percentage (%) for each group by grouping velocity signal ratio values of the cylinders, e.g., a velocity signal ratio value of $b_1$% at the cylinder $a_1$, a velocity signal ratio value of $b_2$% at the cylinder $a_2$, a velocity signal ratio value of $b_3$% at the cylinder $a_3$, and so forth.

The torque correction process in the embodiment described above will now be explained in detail with reference to FIGS. 7 and 9.

The correction values set in the correction value table 35 inside the controller 103 are read out during the normal seek operation and are used for correction.

This correction is carried out by sending a correction instruction from the controller 103 to the correcting unit 37 to correct the gain of the coarse control and the gain of the fine control.

First of all, when the controller 103 receives a seek instruction from a host apparatus when the positioning servo control of the magnetic disk is effected, the controller 103 changes over the switch 6 to the coarse side.

The controller 103 forms a velocity curve corresponding to the number of tracks to the target track, outputs the instruction velocity to the D/A converter 14, and, drives the VCM 40 by applying the velocity error from the comparator 15 through the switch 6 and the corresponding unit 37.

The servo data read by the magnetic head 3 from the servo surface of the magnetic disk 1 are controlled by the AGC amplifier 7 so that the level difference between the inner peripheral portion and the outer peripheral portion of the magnetic disk 1 becomes constant.

Figure 2A:
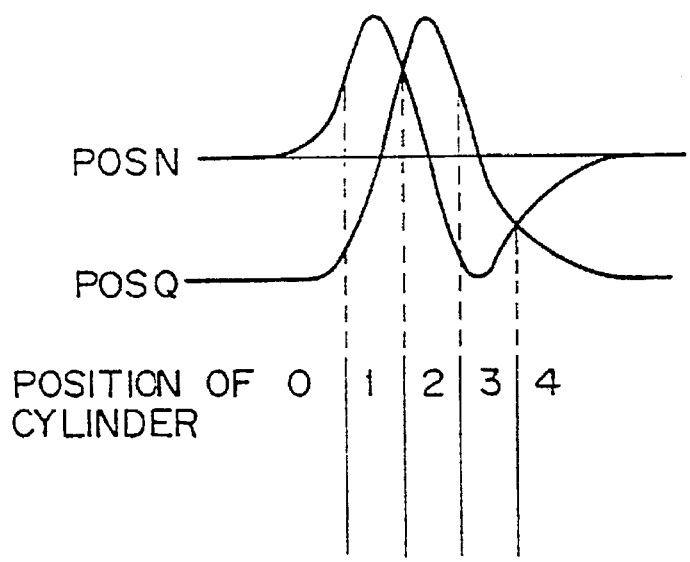
FIGS. 2(A) and 2(B) are explanatory views of principal portions of the system shown in FIG. 1.
Figure 2B:
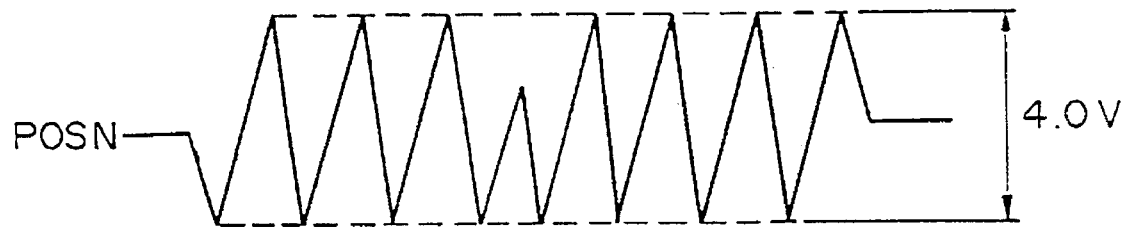

The position signal demodulator 9 generates the two phase position signals POSN and POSQ on the basis of the data from the AGC amplifier 7 (see FIG. 2(A)).

This position signal is converted to a digital signal by the A/D converter 12 and is input to the controller 103, so that the position can be detected. The signal is also input to the velocity detector 11, where the actual velocity is detected.

After detecting the position, the controller 103 generates the velocity instruction corresponding to the detected position, and outputs it to the comparator 15 through the D/A converter 14.

The comparator 15 subtracts the current velocity detected by the velocity detector 11 from the instruction velocity described above and outputs the resulting velocity error.

Judging from the position detection that a position in the vicinity of the target position is now reached, the controller 103 changes over the switch 6 to the fine side, brings the VCM 40 into the fine control by applying the fine control signal of the position signal selector 10 to the power amplifier 5 through the correcting unit 37, and positions the head 3 at the target track and holds it there.

The head positioning servo control is effected in the manner described above. In this instance, the controller 103 reads out the correction value of the corresponding cylinder from the correction value table 35 contained therein, and determines the correction value of the gain corresponding to this correction value of the cylinder position.

The correction value of the gain thus obtained is sent to the correcting unit 37, which corrects the gain.

If the ratio of the velocity signals set to the correction value table 35 is 95%, for example, this value is insufficient by 5% from 100%. In this case, therefore, a +5% gain correction needs to be made.

When this +5% correction is made by the correcting unit 37, the torque of the VCM can always be kept constant, and correct positioning can be achived.

Though the description given above explains the embodiment shown in FIG. 7, the present invention can be practiced in the following way, as well.

(1) The VCM is not limited to the rotary type, and other structures can also be employed.

(2) Besides the VCM type actuator, other types of actuators may used.

(3) The drop in the torque can be corrected by other methods, besides the correction by the correcting unit 37. For example, the signal on the input side of the switch 6 may also be corrected.

(4) The memory unit 38 is constituted by an EEPROM and the correction value is set in the correction value table of this EEPROM before shipment from a factory so that a user can make corrections during normal operation by the use of the correction value.

As described above, the embodiments of the present invention provide the following effects.

(1) The torque of the VCM (the force determined by F=B·l·i) drops in the vicinity of the innermost and outermost cylinder regions, as one of the characteristics of the VCM. High precision head positioning control can be achieved by correcting this drop in the torque.

(2) Since the correction value (the ratio of the velocity signal $S_{v1}$ to the velocity signal $S_{v2}$) can be obtained while the seek operation is being carried out, the process for setting the correction data can be executed at high speed.

(3) The torque of the VCM (the force determined by F=B·l·i) drops with an increase in temperature. Since the correction data setting process can be executed at high speed, however, the process can be carried out without adverse influence from the temperature rise. The process for setting the correction data can also be carried out periodically during the normal operation.

While the present invention has been described as related to the preferred embodiments such as the first and second embodiments, it will be understood that various changes and modifications may be made without departing from the spirit and the scope of the invention as hereinafter claimed.

We claim:

1. A head positioning control system including:

a head for reading and writing data from and to a recording medium;

an actuator for moving said head to a plurality of predetermined positions corresponding to cylinders of a surface of said recording medium;

means for generating a position signal for each of said plurality of positions representative of a current position of said head in relation to the surface of said recording medium as said head is moved to each of said plurality of positions, from a signal read out from said head; and means for conducting a seek operation by driving said actuator and executing positioning control of said head on the basis of said position signal for each of said plurality of positions, wherein a first velocity signal obtained by differentiating said position signal and a second velocity signal obtained by integrating a driving current for driving said actuator are compared with each other during the seek operation, and the driving current of said actuator is so corrected as to offset the difference between said first and second velocity signals during the seek operation according to the position signal corresponding to the location of the head with respect to each of said plurality of positions.

2. A head positioning control system comprising:

a magnetic disk drive including at least one magnetic head for reading and writing data from and to at least one magnetic disk, and an actuator for moving said magnetic head to a predetermined position on said magnetic disk;

means for generating a position signal from a servo signal read out from said magnetic head for each of a plurality of positions corresponding to cylinders of said magnetic disk; and means for conducting a seek operation by driving said actuator and effecting positioning control of said magnetic head on the basis of said position signals, wherein a first velocity signal obtained by differentiating said position signal and a second velocity signal obtained by integrating a driving current for driving said actuator are compared with each other during the seek operation, and the driving current of said actuator corresponding to each position on said magnetic disk is corrected during the seek operation in such a manner as to offset a difference between said first and second velocity signals according to the position signal corresponding to the location of the head with respect to each of said plurality of positions.

3. A head positioning control system according to claim 2, wherein said actuator includes a voice coil motor having a rotary spindle for moving said magnetic head in a radial direction of said magnetic disk, said voice coil motor includes a coil positioned on an opposite side to said magnetic head with respect to said rotary spindle, and magnets disposed on and below said coil, for supplying a magnetic field necessary of said actuator to generate a predetermined torque, to said coil, and said control system operates in such a manner as to detect the drop in a magnetic flux density corresponding to said magnetic field and to correct the drop in said torque.

4. A head positioning control system according to claim 3, wherein correction of the drop in said torque is correction for the drop in said torque in the vicinity of the innermost and outermost cylinders of said magnetic disk.

5. A head positioning control system including:

a head for reading and writing data from and to a recording medium;

an actuator for moving said head to a plurality of predetermined sampling positions corresponding to cylinders of a surface of said recording medium, and including sampling positions in one or both of an innermost peripheral region and an outermost peripheral region of said medium;

means for generating a position signal for each of said plurality of predetermined sampling positions representative of a current position of said head in relation to the surface of said recording medium as said head is moved to each of said plurality of sampling positions, from a signal read out from said head; and means for driving said actuator and executing positioning control of said head on the basis of said position signal, wherein a first velocity signal obtained by differentiating said position signal and a second velocity signal obtained by integrating a driving current for driving said actuator are compared with each other, and the driving current of said actuator is so corrected as to offset the difference between said first and second velocity signals;

means for computing a ratio of said first velocity signal to said second velocity signal for each of said plurality of sampling positions, and storing in advance said ratio of said velocity signals for each of said plurality of sampling positions as data for correcting the driving current of said actuator; and wherein the ratio of said velocity signals for each of said plurality of sampling positions stored in advance is read out in correspondence to the location of the head with respect to each of the plurality of sampling positions when said head is driven by said actuator, and the driving current of said actuator is increased on the basis of the ratio of said velocity signals thus read out so as to correct any drop in a torque of said actuator.

6. A head positioning control system comprising:

a magnetic disk drive including at least one magnetic head for reading and writing data from and to at least one magnetic disk, and an actuator for moving said magnetic head to a plurality of predetermined sampling positions corresponding to cylinders of said magnetic disk on said magnetic disk, and including sampling positions in one or both of an innermost peripheral region and an outermost peripheral region of said magnetic disk;

means for generating a position signal from a servo signal read out from said magnetic head for each of said plurality of sampling positions;

means for driving said actuator and effecting positioning control of said magnetic head on the basis of said position signal, wherein a first velocity signal obtained by differentiating said position signal and a second velocity signal obtained by integrating a driving current for driving said actuator are compared with each other, and the driving current of said actuator corresponding to each position on said magnetic disk is corrected in such a manner as to offset a difference between said first and a second velocity signals;

means for computing in advance a ratio of said first velocity signal to said second velocity signal for each of said plurality predetermined sampling positions, and storing in advance the ratio of said velocity signals for each of said plurality predetermined sampling positions as data for correcting the driving current of said actuator; and wherein said ratio of said velocity signals for each of said plurality predetermined sampling positions stored in advance is read out in correspondence to the location of the head with respect to each of the plurality of sampling positions when a seek operation is carded out for moving said magnetic head to a predetermined position on said magnetic disk for the read/write operation, and the driving current of said actuator is increased on the basis of said ratio of said velocity signals thus read out so as to correct any drop in a torque of said actuator.

7. A head positioning control system according to claim 6, wherein said actuator includes a voice coil motor having a rotary spindle for moving said magnetic head in a radial direction of said magnetic disk, said voice coil motor includes a coil positioned on an opposite side to said magnetic head with respect to said rotary spindle, and magnets disposed on and below said coil, for supplying a magnetic field necessary for said actuator to generate a predetermined torque, to said coil, and said control system operates in such a manner as to detect the drop in a magnetic flux density corresponding to said magnetic field and to correct the drop in said torque.

8. A head positioning control system according to claim 7, wherein correction of the drop in said torque is correction for the drop in said torque in the vicinity of the innermost and outermost cylinders of said magnetic disk.

\* \* \* \* \*

UNITED STATES PATENT AND TRADEMARK OFFICE
CERTIFICATE OF CORRECTION

PATENT NO. : 5,659,438
DATED : August 19, 1997
INVENTOR(S) : Sasamoto et al.

It is certified that error appears in the above-indentified patent and that said Letters Patent is hereby corrected as shown below:

Column 3, line 54, delete "to Judge" and insert --to judge-- therefor.

Column 4, line 41, delete "the velocity" and insert --the vicinity-- therefor.

Column 5, line 9, delete "the magnetic" and insert --the magnet-- therefor.

Column 5, line 18, delete "of Such" and insert --of such-- therefor.

UNITED STATES PATENT AND TRADEMARK OFFICE
CERTIFICATE OF CORRECTION

PATENT NO. : 5,659,438
DATED : August 19, 1997
INVENTOR(S) : Sasamoto et al.

It is certified that error appears in the above-indentified patent and that said Letters Patent is hereby corrected as shown below:

Column 5, line 25, delete "center" and insert --of the center-- therefor.

Column 5, line 25, delete "of the cylinder" and insert --cylinder-- therefor.

Column 5, line 62, delete "is Obtained" and insert --is obtained-- therefor.

Column 8, line 10, delete "cylinder region" and insert --cylinder regions-- therefor.

Column 10, line 2, delete "Value of" and insert --value of-- therefor.

UNITED STATES PATENT AND TRADEMARK OFFICE
CERTIFICATE OF CORRECTION

PATENT NO. : 5,659,438
DATED : August 19, 1997
INVENTOR(S) : Sasamoto et al.

It is certified that error appears in the above-indentified patent and that said Letters Patent is hereby corrected as shown below:

Column 13, line 15, delete "be achived" and insert --be achieved-- therefor.

Column 13, line 23, delete "used" and insert --be used-- therefor.

Column 14, line 48, delete "necessary of" and insert --necessary for--therefor.

Column 16, line 20, delete "carded out" and insert --carried out-- therefor.

Signed and Sealed this

Third Day of November, 1998

Attest:

Attesting Officer

BRUCE LEHMAN
Commissioner of Patents and Trademarks